(12) United States Patent
Grubb et al.

(10) Patent No.: US 7,725,464 B2
(45) Date of Patent: May 25, 2010

(54) COLLECTION AND DELIVERY OF INTERNET ADS

(75) Inventors: Michael L. Grubb, San Francisco, CA (US); Jeffrey D. Arena, San Francisco, CA (US); Michael A. Schoen, Tiburon, CA (US); Bruce M. Martin, San Mateo, CA (US)

(73) Assignee: LookSmart, Ltd., San Francisco, CA (US)

( * ) Notice: Subject to any disclaimer, the term of this patent is extended or adjusted under 35 U.S.C. 154(b) by 62 days.

(21) Appl. No.: 11/535,958

(22) Filed: Sep. 27, 2006

(65) Prior Publication Data

US 2007/0214132 A1 Sep. 13, 2007

Related U.S. Application Data

(60) Provisional application No. 60/721,311, filed on Sep. 27, 2005, provisional application No. 60/723,812, filed on Oct. 5, 2005.

(51) Int. Cl.
*G05F 7/00* (2006.01)
(52) U.S. Cl. .................................................. 707/723
(58) Field of Classification Search ................ 707/1–10
See application file for complete search history.

(56) References Cited

U.S. PATENT DOCUMENTS

| | | | |
|---|---|---|---|
| 6,101,491 A | 8/2000 | Woods | |
| 6,134,541 A | 10/2000 | Castelli | |
| 6,269,361 B1 | 7/2001 | Davis | |
| 6,493,702 B1 | 12/2002 | Adar et al. | |
| 6,557,028 B2 | 4/2003 | Cragun | |
| 6,571,282 B1 | 5/2003 | Bowman-Amuah | |
| 6,631,372 B1 | 10/2003 | Graham | |
| 6,643,640 B1 | 11/2003 | Getchius et al. | |
| 6,718,365 B1 | 4/2004 | Dutta | |
| 6,778,977 B1 | 8/2004 | Avadhanam et al. | |
| 6,826,559 B1 | 11/2004 | Ponte | |
| 7,076,479 B1 * | 7/2006 | Cheung et al. .................. 707/3 |
| 7,136,875 B2 * | 11/2006 | Anderson et al. ........ 707/104.1 |

(Continued)

OTHER PUBLICATIONS

Mindy Charski, "The Virtuous Search Engine," Interactive Week, Jun. 4, 2001.

(Continued)

*Primary Examiner*—Wilson Lee
(74) *Attorney, Agent, or Firm*—Brunell IP, PC; Norman E. Brunell (57) ABSTRACT

Advertisements over a network, such as the Internet, by extracting an index file of suppliers of search result sets for a plurality of keywords and/or an index of ads to be placed. A keyword in a received query may be matched to the suppliers of related search result sets and/or the ads to be placed in the index file(s). The search results may be ranked based on various criteria such as yield, click through rates and history of dealings. Search result sets for the keywords from the matching suppliers and the ads to be placed may be combined to produce a search result set ranked in accordance with estimated yields for advertisements associated with each result in the search result set and delivered in response to the received query. The search results in the combined set may be reranked and/or repriced.

30 Claims, 5 Drawing Sheets

U.S. PATENT DOCUMENTS

| | | | |
|---|---|---|---|
| 7,200,627 B2 | 4/2007 | Stickler | |
| 7,225,182 B2 * | 5/2007 | Paine et al. | 707/3 |
| 7,231,358 B2 * | 6/2007 | Singh et al. | 705/14 |
| 7,284,008 B2 | 10/2007 | Henkin et al. | |
| 7,295,996 B2 | 11/2007 | Skinner | |
| 2002/0116313 A1 | 8/2002 | Detering | |
| 2003/0028529 A1 * | 2/2003 | Cheung et al. | 707/3 |
| 2004/0044571 A1 | 3/2004 | Bronnimann et al. | |
| 2004/0117353 A1 | 6/2004 | Ishag et al. | |
| 2005/0038688 A1 | 2/2005 | Collins et al. | |
| 2005/0050023 A1 | 3/2005 | Gosse et al. | |
| 2005/0065806 A1 | 3/2005 | Harik | |
| 2005/0076017 A1 | 4/2005 | Rein et al. | |
| 2005/0131866 A1 | 6/2005 | Badros et al. | |
| 2005/0144069 A1 | 6/2005 | Wiseman et al. | |
| 2005/0154719 A1 | 7/2005 | Choudhary | |
| 2005/0222900 A1 | 10/2005 | Fuloria et al. | |
| 2005/0289043 A1 | 12/2005 | Maudlin | |
| 2006/0026064 A1 | 2/2006 | Collins | |
| 2006/0085408 A1 * | 4/2006 | Morsa | 707/3 |
| 2006/0106709 A1 | 5/2006 | Chickering | |
| 2006/0161534 A1 * | 7/2006 | Carson et al. | 707/3 |
| 2006/0178934 A1 | 8/2006 | Besmertinik | |
| 2006/0190354 A1 | 8/2006 | Meisel | |
| 2006/0282328 A1 | 12/2006 | Gerace et al. | |
| 2007/0016473 A1 | 1/2007 | Anderson et al. | |
| 2007/0067215 A1 * | 3/2007 | Agarwal et al. | 705/14 |
| 2007/0129997 A1 * | 6/2007 | Davies | 705/14 |
| 2007/0174118 A1 * | 7/2007 | Dekel et al. | 705/14 |
| 2008/0097833 A1 | 4/2008 | Bharat | |

OTHER PUBLICATIONS

M. Weideman, "Payment for Increasing Website Exposure in Search Engine Results—Technical and Ethical Issues," Proceedings of the 5th Annual Conference on WWW Applications, 2003.

Juan Feng, Hemant K. Bhargava, David Pennock, "Comparison of Allocation Rules for Paid Placement Advertising in Search Engines," Proceedings of the 5th International Conference on Electronic Commerce, pp. 294-299, 2003.

Juan Feng, "Optimal Allocation Mechanisms when Bidders Ranking for Objects is Common," No. 545, Econometric Society 2004, North American Summer Meetings from Econometric Society, Aug. 11, 2004.

* cited by examiner

COLLECTION AND DELIVERY OF INTERNET ADS

CROSS REFERENCE TO RELATED APPLICATIONS

This application claims the benefit of U.S. provisional application Ser. No. 60/721,311 filed Sep. 27, 2005 and Ser. No. 60/723,812 filed Oct. 5, 2005.

BACKGROUND OF THE INVENTION

1. Field of the Invention

This invention is related to ad delivery systems for placing Internet advertising in response to queries from search engine sites.

2. Description of the Prior Art

Conventional ad delivery systems have had problems, for example, with slow response, pricing which discouraged higher bids and limited matching. What is needed is an improved ad delivery system which avoids or reduces the problems inherent in known systems.

SUMMARY OF THE INVENTION

In a first aspect, a method for delivering advertisements via the Internet may include extracting, from a database of advertisements, an index file alphabetized by keyword, each entry in the index file including a bid price for placement of the related advertisement, extracting a table of contents of the index file, each entry in the table of contents for a keyword pointing to a start location of a first entry related to that keyword in the index file, matching a keyword in a query string to advertisements in the database by searching the table of contents to locate the start location of that keyword in the index and matching that keyword to index file entries until a next indexed keyword is encountered, ranking advertisements matching the keyword at least in part on an estimated yield for each such advertisement, pricing the highest ranked advertisement at a price lower than the bid price for that advertisement that retains the ranking for that advertisement for that keyword and responding to the query string with a search result set including a link to the highest ranked advertisement for the keyword.

Each entry in the index file may include a set of preselected keywords associated with the advertisement and the keyword in the query string may be matched with one of keywords in the set of preselected keywords in each entry in the index from the start location to the next indexed keyword. Each entry in the index file may include a text copy of the advertisement and the keyword may be matched with the text copy in each entry in the index from the start location to the next indexed keyword. Each entry in the index file may include a set of preselected keywords associated with the advertisement, a text copy of the advertisement and a selected type of matching algorithm and the keyword in the query string may be matched with one of keywords in the set of preselected keywords in each entry in the index from the start location to the next indexed keyword if a second, broader type of matching algorithm is selected. Each entry in the index file may include a negative keyword and the negative keyword in the index file entry may be matched with another keyword in the query string to prevent a match of the keyword in that query string with that index file entry. Each entry in the index file may include click through rate data for each advertisement and the estimated yield may be determined as a product of the bid price and the click through rate data for each such matching entry.

Further, the search result set may include links to a plurality of other ranked advertisements for the keyword. Each entry in the index file may include a URL linking to the advertisement used a link in the result set to that advertisement. The search result set may be filtered to remove links to entries, based on the URL and/or based on a domain associated with the query string and/or to links to entries having bid prices and/or click through rates below predetermined minimums, before responding.

Further, the index and table of content files may be rebuilt on a daily basis during time periods of relatively low usage and/or may be updated more frequently than the index and table of content files are rebuilt. The index and table of content files may be incrementally updated by adding data to the index and table of contents and marking entries in the TOC for deletion. The table of contents may be stored in RAM. A database of advertisements and click through rates, for each advertisement in the database, may be maintained from which the index file and table of contents may be extracted.

In another aspect, a system for delivering advertisements via the internet may include an index file having entries related to advertisements for delivery via the internet, an extraction engine for updating the index file entries in accordance with changes in a database of said advertisements, a matching engine for matching a keyword in a query string to a plurality of the index file entries, a ranking engine for selecting an advertisement, for inclusion in a search result set responsive to the query string, in accordance with an estimated monetary yield related to one of the plurality of index file entries matching a keyword in the query string and a pricing engine for discounting a charge for that inclusion in accordance with an estimated monetary yield for another one of the plurality of index file entries.

The index file may include an estimated monetary yield for inclusion of the advertisement associated with each index file entry in a search result set. The estimated monetary yield in each index file entry is based in part on an agreed maximum charge for each selection of the related advertisement from a search result set and/or a rate at which the related advertisement has been selected when included in search result sets. The estimated monetary yield may be based on the product of the agreed maximum charge and the click through rate.

The extraction engine may update each index file entry in accordance with data related to selection of the related advertisement when included in search result sets. A reporting system may be included for monitoring a rate at which each advertisement has been selected when included in search result sets and the extraction engine may responsive to the reporting system for updating the index file. The ranking engine may selects the advertisement in accordance with the index file entry having the highest estimated monetary yield and the pricing engine may discount the charge for inclusion in accordance with the entry having the next highest estimated monetary yield.

A table of contents file having TOC entries related to entries in the index file may be included. A first memory for storing the index file and a second memory, having a faster time to retrieve data than the first memory, may be included for storing the table of contents file. The extraction engine may periodically rebuild the index and table of content files and may update the index and table of content files more frequently than they are rebuilt. A first selectable matching algorithm for matching keywords in the query string to keywords stored in each of the index file entries, and a second selectable matching algorithm for matching keywords in the query string to words in each related advertisement, may be provided. The index file entries may include a selection between the first and second matching algorithms. The matching engine may not match a keyword in the query string with an otherwise matching one of the index file entries when the matching file does match a specified negative keyword in that one of the index file entries with a keyword in the query string.

A database of advertisements and click through rates for each advertisement in the database may be included wherein the extraction engine updates the index file in accordance with changes in the database.

In another aspect, a method of delivering advertisements over a network may include extracting an index file of suppliers of search result sets for a plurality of keywords, matching a keyword in a received query to the suppliers of related search result sets in the index file, combining search result sets related to the keyword obtained from the matching suppliers to produce a search result set ranked in accordance with estimated yields for advertisements associated with each result in the search result set, delivering the search result set in response to the received query and/or ranking the suppliers of search result sets and requesting search result sets related to the keyword from the suppliers in accordance with the ranking of the suppliers.

The suppliers may be ranked in accordance with data related to a quality of prior search result sets provided by each supplier in response to prior requests for search result sets. Suppliers may be ranked in accordance with a yield of advertisements associated with prior search result sets provided by each supplier in response to prior requests for search result sets. Suppliers may be ranked in accordance with a response time for providing prior search result sets provided by each supplier in response to prior requests for search result sets. Further, suppliers may be ranked in accordance with a geographical locale for advertisements with associated prior search result sets provided by each supplier in response to prior requests for search result sets.

The method may also include determining an estimated geographical locale for advertisements associated with the prior search result sets in accordance with a network address of each supplier or determining an estimated geographical locale for a source of the query in accordance with a network address of the source. The ranking of suppliers may be related to a geographical locale for the query. An estimated geographical locale for a source of the query may be determined in accordance with a network address of the source. The geographical locale of the query may also be estimated from the presence of certain words in the query, such as local spellings or dialect, place names, or words known to be from a certain language used in certain places.

The suppliers may be ranked in accordance with a categorization of ad content for the advertisements associated with each supplier. A categorization of content of the query may be compared with a categorization of ad content associated with each supplier.

At least some of the ads from the matching suppliers may be repriced before delivering the search result set in accordance with data related to an estimated yield for each ad. Some of the ads from the matching suppliers may be repriced in accordance with data related to estimated click through rate for each ad before delivering the search result set in response to the query. Search result sets may be received from at least some of the matching suppliers including data related to click through rates for ads related to at least some of the results in the search result set provided by each of those matching suppliers. Some of the ads from the matching suppliers may be repriced before delivering the search result set by changing cost per click data delivered with the search result set in response to the query. Some of the ads from the matching suppliers may be effectively repriced before delivering the search result set by changing a revenue sharing arrangement with those suppliers.

In still another aspect method of delivering advertisements over a network may include matching a keyword in a received query to suppliers of related search result sets from an index of suppliers extracted from a database of suppliers and to ads to be placed from an index of advertisers extracted from a database of ads to be placed, combining search result sets related to the keyword obtained from the matching suppliers and a search result from the matching ads to be placed to produce a combined search result set ranked in accordance with estimated yields for advertisements associated with each result in the combined search result set and delivering the combined search result set in response to the received query.

One search result set entry, from a set of search result set entries associated with a common advertisement, may be selected in accordance with an estimated yield. Matching suppliers may be ranked in accordance with their ranking before requesting search result sets related to the keyword from those matching suppliers. Search result sets received from the matching suppliers may be ranked and/or search results associated with the matching advertisements may be ranked.

Ranked search result sets from the matching suppliers and those associated with the matching advertisements may be combined in accordance with their individual rankings. Ranked search result sets from the matching suppliers received within a preselected period of time and the ranked search result sets associated with the matching advertisements may be combined in accordance with their individual rankings. The preselected period of time may be adjusted in accordance with a quality of the ranked search result set associated with the matching advertisements and the quality may be the quantity of the matching advertisements. Ads associated with combined search result set may be combined, before delivering the search result set, in accordance with data related to estimated yield for each ad.

At least some of the ads may be repriced in the combined search result set in accordance with data related to an estimated click through rate for each ad. Search result sets from at least some of the matching suppliers may be received including data related to click through rates for associated ads. At least some of the ads associated with the combined result set may be repriced by changing cost per click data associated with each such repriced ad and/or at least some of the ads associated with the combined search result set by changing a revenue sharing arrangement associated with each such effectively repriced ad.

DETAILED DISCLOSURE OF THE PREFERRED EMBODIMENT(S)

An ad delivery system, for a network such as the internet, may include a database of ads and an ad delivery engine which may include an extraction engine to extract the ads into an index data file, and a table of contents or TOC, may match the ads to a query string from a search engine site using different matching criteria while excluding some otherwise matching ads, may rank the matched ads based on a potential yield such as maximum bid or cost per click, adjusted for example by an actual or observed click-thru rate, may price the ads on a different basis than ranking, for example, by discounting the ranking basis to the minimum which preserves the ranking, and/or may filter the ads based on predetermined criteria.

The extraction engine may provide a full rebuild of the index, and TOC, on a periodic basis such as once per day, while providing an update, by indexing only data new since the last full rebuild, on a more frequent basis. The TOC may be saved in a relatively fast memory, such as RAM memory, while the index because of its size may be saved in a relatively slower memory such as on disk. The TOC, which is alphabetized in accordance with keywords, may contain a pointer to the location of the first byte related to each set of alphabetized keywords, to reduce the time required to search through the entries in the index for each group of keyword entries. The terms "keyword" or "keywords" are used herein to denote both one or more individual keywords, one or more key phrases, or groups of words, and combinations of one or more keywords with one or more key phrases Referring now to FIG. 1, system 10 for high-performance delivery of Internet advertisements is disclosed which may include an incrementally updated engine 12 for extracting, indexing, matching, ranking, pricing, and filtering advertisements. Engine 12 may operate by extracting advertisements from ad database 14 and building an index and/or a table of contents (or TOC) for the index. This index can be periodically rebuilt, and may also be incrementally updated between rebuilds. A TOC for the index may also be rebuilt each time and includes a pointer to the location in the index. The index is preferably alphabetized based on keywords so that all ads related to a specific keyword may be found beginning at a particular start location in the index. The TOC, if built, would then also be alphabetized by keyword and provide the start location in the index for all entries associated with a particular keyword or key phrase.

Figure 1:
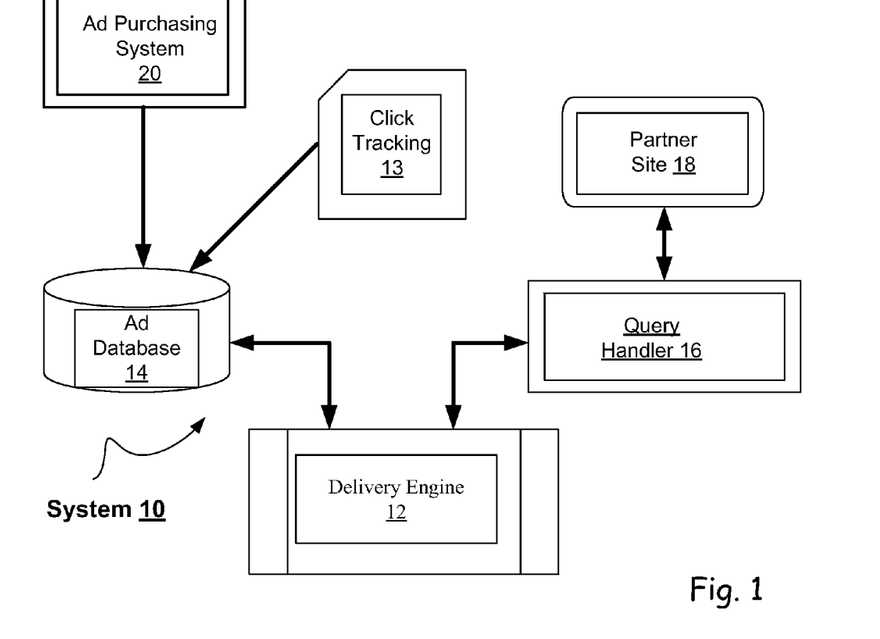
FIG. 1 is a block diagram overview of an advertisement delivery system.

While in operation, query handler 16 receives a query from an Internet website such as Partner Site 16 and returns a list of advertisements. The query is keyword matched to advertisements by one of multiple selected matching algorithms. Matching advertisements may then be rank ordered by yield, e.g. financial yield. Prices may then be set for placement of each matching advertisement. Some advertisements may be filtered out of the result set. Ultimately, Delivery engine 12 returns a result set or list for the query, each entry of which may include a) creative material such as the content of the ad, b) price information, and c) one or more URL (or uniform resource locators) for each advertisement.

The operation of delivery engine 12 can be subdivided into five elements: (1) indexing, (2) matching, (3) ranking, (4) pricing, and (5) filtering.

Delivery engine 12 makes use of a technique called normalization. A text sample has been normalized if it has been stemmed, stopped, and sorted. Stemming refers to reducing the word or phrase to its stem (thus plurals become singular, for example). "Stop" words (i.e., words that have been identified to be detrimental to relevance because they are grammatical indicators or otherwise excessively common or inappropriate) are then removed. Finally, multiple word and phrase elements are sorted alphabetically.

(1) Indexing. In order to build its index, delivery engine 12 may take a complete extract of advertisements from advertisement database 14, which preferably may be a relational database. The extract preferably includes entries for ads in the form of creative material, advertiser web site URL, one or more keywords, MaxCPC, observed click-through rate, choice of matching algorithm, and one or more of various advertisement options. MaxCPC may be the maximum cost-per-click price that the advertiser is willing to pay for each placement of the ad. Advertisement database 14 may have been populated through some source of advertisements, such as ad purchasing system 20, in which potential advertisers may purchase advertisements, that is, purchase placement of their advertisements.

Delivery engine 12 reads advertisement data extracted from database 14 and saves it in an ad data file or index. It may also save several fields of each record in the extract to a TOC (table of contents) file. These fields may include each keyword, the byte location of the start of its record in the ad data or index file, pricing fields, and filtering fields. Incremental updates may occur on a periodic batch basis; inserts, updates and deletes may be processed by adding new data to the ad data file (e.g. inserts and updates) and by marking items in the TOC File (e.g. deletes).

(2) Matching. Delivery engine 12 can match queries from query handler 16 to advertisements using one or more matching algorithms such as the SmartMatch or BroadMatch algorithm described below. A query consists of a query string of one or more words, as well as flags indicating the source of the query, such as partner site 18. Partner site 18 may have a distribution arrangement with the proprietor of delivery engine 12 and may receive search requests from its clients which it forwards to sources of search results such as delivery engine 12. The query string may also include other details of the original request made to partner site 18. Delivery engine 12 constructs a result set of matching advertisements, and or other query results which are then provided to Query Handler 16 for use by partner site 18 in responding to search requests made to site 18 by its clients.

a. A so-called SmartMatch algorithm may be applied to keywords that have been normalized at purchase time, that is, when the advertising placement was purchased through ad purchasing system 20. At query time, that is when a query is processed by query handler 16, the query may be normalized using identical rules to the rules used at purchase time. Exact matches between query and keywords are considered positive matches by the SmartMatch algorithm. In other words, an ad purchaser may be able to select the words in a query which cause the ad to be selected or matched.

b. A so-called BroadMatch algorithm matches for all keywords associated with the ad that are contained within the query. Thus, an advertisement associated with keyword "red bull" would be a positive match using the BroadMatch algorithm with a query of "red bull drink". Advertisers may also specify negative keywords when using the BroadMatch option. "Negative keywords" are text strings which cause the match to fail when they are found in the query string, even if there is otherwise a match. Thus, an advertisement associated with keyword "red bull" could specify "soda" as a negative keyword so that the BroadMatch algorithm would not indicate a match with a query which included the phrase "red bull soda". Matches are found by extracting known phrases from the normalized query. Each known phrase may be associated with one or more advertisements in the TOC File. All associated advertisements may be combined into one result set. Only the longest phrases may be considered because advertisements associated with sub phrases may already be combined into the longest phrases in the TOC File.

(3) Rank ordering. Delivery engine 12 may rank advertisements associated with keywords which have been matched to the incoming query from query handler 16. The rank ordering in the result set may be determined by the actual or projected yield to the proprietor of delivery engine 12. "Yield" in the system 10 may be defined as the product of the click-through rate with MaxCPC, that is, yield may be based on the amount of money to be paid by the advertiser for placement of an ad. The MaxCPC may be set by the advertiser at purchase time, e.g. in whatever ad purchasing system 20 which populates the advertisement database 14. The click-through rate may be determined by click tracking system 13, which may also perform web advertisement click-through and redirect operations, and which may update advertisement database 14 with such information for each advertisement.

(4) Pricing. Delivery engine 12 may set the price paid by each purchaser of ad space for space allotted to each advertisement in the result set. Prices may be limited to not exceed the MaxCPC. Prices may be discounted to the lowest price necessary to provide the optimal placement of the advertisement, e.g. the lowest price at which an ad may be placed without changing its ranking relative to other ads matching the same keywords. Ad placement may be subject to reserve prices (minimum or maximum price for certain keywords and/or distribution partners, such as partner site 16) and may then be eliminated from the result set if they do not meet the reserve. Under some circumstances, there may be additional discounts which are applied to prices before the result set is returned.

(5) Filtering. Advertisements in the result set may be filtered out, or otherwise treated specially, on the basis of a number of criteria, including minimum click-through rate, minimum price, advertiser's domain, or domain of the referring site.

Figure 2:
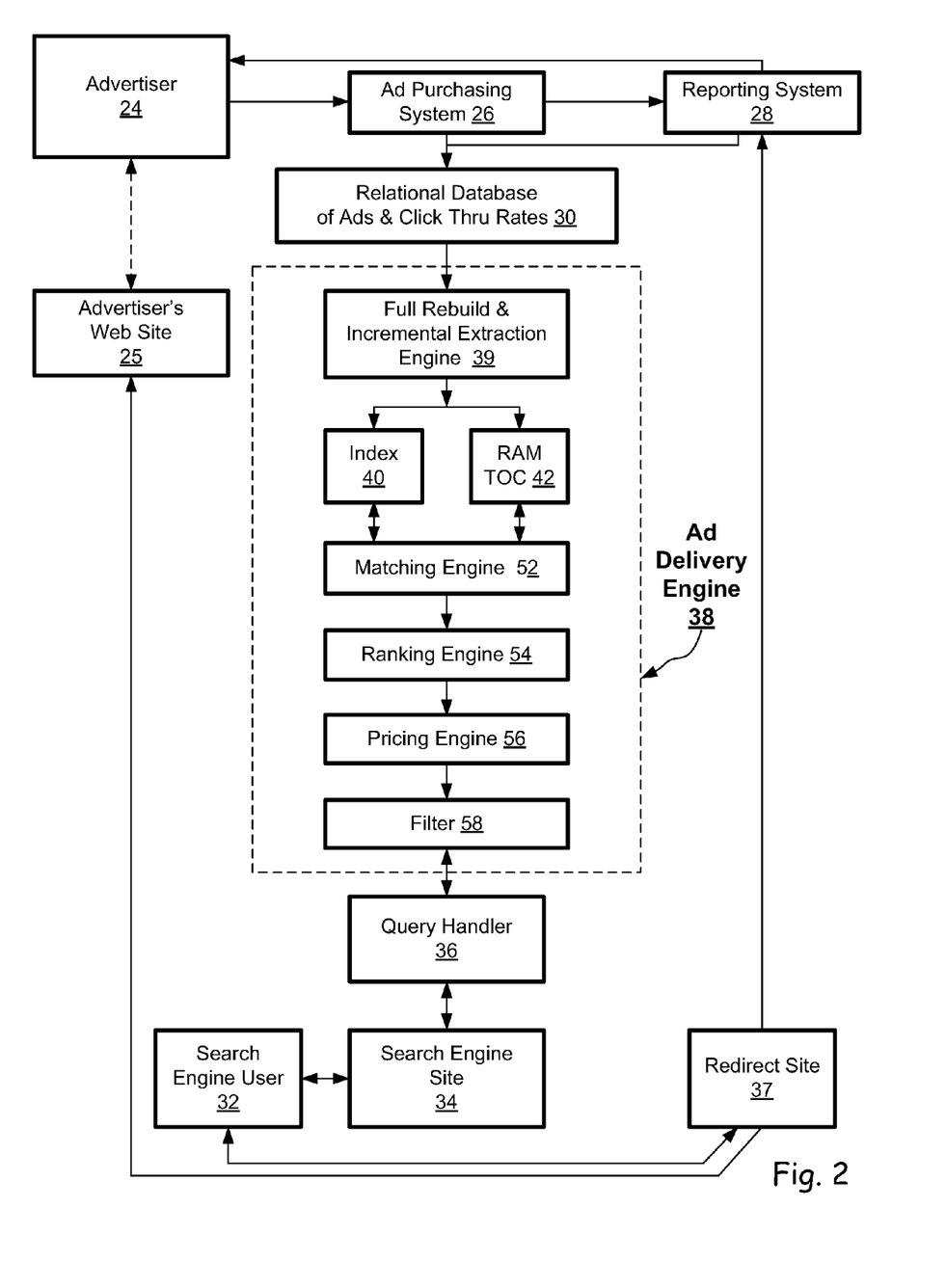
FIG. 2 is a block diagram of an alternate, more detailed embodiment of an ad delivery system.

Referring now to FIG. 2, in a preferred embodiment, a potential ad purchaser such as advertiser 24, may purchase placements for its advertisements for products or services from ad purchasing system 26. The advertisements may be retrievable from a specific URL, such as advertiser's web site 25. Ad purchasing system 26, and/or reporting system 28, stores data or causes data to be stored related to the advertisement purchase and estimated or actual click-through rates determined thereafter, in one or more related databases such as database of ads and click thru rates 30. Database 30 is typically a relational database of advertisements with fields for data in the form of creative material, such as the advertisement content at a specific URL, a reference to a related URL e.g. for advertiser's web site 25, one or more keywords or key phrases (hereinafter "keywords") related to the content of the ad, the purchaser's bid such as the maximum cost per click (MaxCPC) that ad purchaser is willing to pay for placement of the associated advertisement, an estimated or other click-through rate (preferably an observed click-thru rate after the advertisement has been purchased and distributed), the purchaser's choice of matching algorithm, and one or more various other advertisement options.

In operation, search engine user 32 may be connected to search engine site 34 (e.g. partner site 18 shown in FIG. 1) requesting a search, such as a search for "car washes". Search engine site 34 may contact query handler 36 (as well as other ad delivery system query inputs) to determine if search results can be provided. In response, query handler 36 provides a query string to ad delivery engine 38 which obtains a filtered and ranked list of matching advertisements based on data in database 30 and returns that list to search engine site 34. Search engine site 34 may combine the returned list with other lists of search results and deliver the combined list as search results to search engine user 32.

User 32 may select, or click on, one of the entries in the list provided in response to the search user's search request and be transparently redirected to another site, such as redirect site 37, which directs user 32 to advertiser's web site 25.

Reporting system 28, or a similar mechanism for example associated with redirect site 37, may then detect the selection made by user 32 when user 32 clicks on the particular advertisement on the list of search results provided to user 32, or at least on the portion of that list provided via ad delivery engine 38, and records that action, e.g. for example as a click for which advertiser 24 will be charged and/or to determine a click through rate e.g. the percentage of the time that the specific URL is selected by a user when listed in the search results. Reporting system 28, or a similar mechanism, may then causes the click through rate to be stored in database 30 and associated therein with the advertisement to which it is related.

In operation, extraction engine 39 in ad delivery engine 38 may extract information from database 30 to fully and/or incrementally rebuild index 40 and TOC 42.

Preferably, extraction engine 39 performs full rebuilds of index 40 and/or TOC 42 on a regular basis, such as once per day. A full rebuild of index 40 may require a substantial amount of time to extract the data related to each advertisement in database 30 and therefore such rebuilds are typically done during time periods of relatively low usage, for example at midnight each day. Index 40 may be a simple, but potentially large data file but is, of course, much smaller than ad database 30. Index file 40 may be stored on disk, or other relatively slow memory compared to memory on which TOC 42 may be stored, because of its size.

Index 40 is preferably alphabetized in accordance with its keywords. For example, if one of the keywords for advertiser 24 is "car wash", data related to the ad for advertiser 24 would be stored alphabetically in index 40 based on the keyword phrase "car wash". If "car wash" is also a keyword phrase for another advertiser, the data for that other advertiser would preferably be stored in index 40 adjacent to the data for all other ads having the same keyword, such as the ad for advertiser 24. The benefit of this simple, alphabetized storage approach will be more apparent from the description below of index 40 and/or TOC 42.

A subset of the data stored in index 40 may also be stored in TOC 42, preferably including data related to the keywords, pricing, filtering fields (described below in greater detail) and observed click-through rates for each advertisement as well as a pointer to the location of that data in index 40. The pointer is preferably related to the location of first byte (or start byte) of data for the first stored advertisement data for the associated keyword or phrase stored in index 40. That is, the pointer in TOC 42, for the data related to all advertisements for which "car wash" is a keyword, would point to the start byte location in index 40 for the first listed advertisement for which "car wash" is a keyword. Thus, some data for all advertisements for which "car wash" is a keyword in index 40 can easily, and quickly, be found by TOC 42 by starting at the start byte location for the first listed advertisement for that keyword in index 40 and processing the data found thereafter until a new keyword is found. Thus, the ranking of all ads related to each particular keyword may easily be accomplished at one time because all such ads are listed together in index 40 which includes the location of each such ad in full ad database 30.

In addition, incremental updates may also be performed on a periodic basis more often than the full rebuilds of index 40. For example, if the full rebuilds of index 40 and/or TOC 42 are performed daily at midnight, incremental rebuilds may be done on an hourly basis during the day. As a result of an incremental update, inserts, updates and deletes may be processed by adding new data to index 40 and TOC 42 for inserts and updates and by marking items in the TOC File for deletions.

One of the reasons for combining both full and incremental rebuilds and updates is that reliance on full rebuilds would limit the accuracy of index 40 and TOC 42 with regard to the then current state of database 30 and/or require more time for response to a query.

Reliance on a repetitively updated, but not often rebuilt, index 40 and TOC 42 may also limit the accuracy of index 40 and TOC 42 because an error, once it occurs, would be difficult or impossible to correct.

Preferably, TOC 42 may be used to provide faster access to index 40 and would therefore typically be stored in a faster memory, such as RAM, to speed up the processing by ad delivery system 38. In particular, locating the address of the first or start byte in index 40 for all entries for a particular keyword or phrase by searching in TOC 42 in RAM may be a very quick and time efficient process. By also storing some additional specific data in RAM TOC 42 for each advertisement, such as pricing or filtering data, the processing time requirements of other aspects of ad delivery engine 38 including ranking engine 54, pricing engine 56 and filter 58, may also be optimized. The processing time for matching engine 52, in addition to the preferably optimized time for locating the starting byte in index 40 for all entries for a particular keyword or phrase which are stored adjacent to each other, remains dependent on the speed of the memory in which index 40 is stored, for example, on a hard disk or other memory typically relatively slower than RAM.

Figure 3:
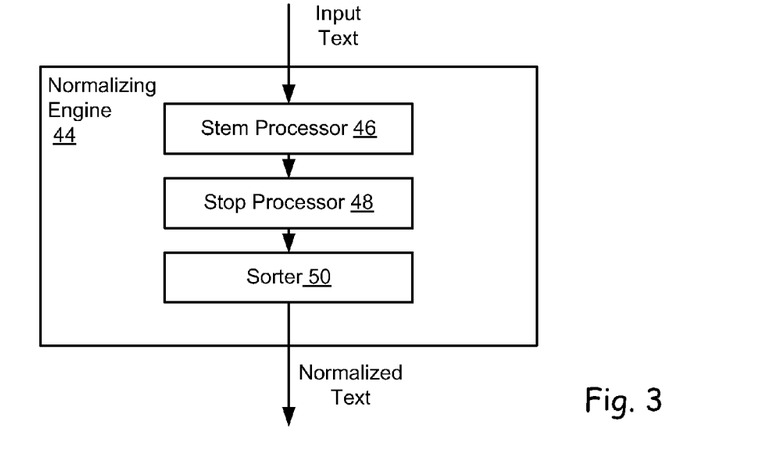
FIG. 3 is a flow chart of a normalizing engine.

Referring now also to FIG. 3, in normalizing engine 44, stem processor 46 reduces each word or phrase to its stem e.g. "car washes" becomes "car wash". Thereafter, stop processor 48 removes words that have previously been identified to be detrimental to relevance such as excessively common words including "the", "an" etc. as well as inappropriate words and/or grammatical indicators. Thereafter, multiple word and phrase elements are sorted alphabetically in sorter 50. The text input to normalizing engine 44 may be advertising content, and/or separately identified keywords and phrases, in database 30 and the normalized text may be applied to index 40 and/or TOC 42.

Similarly, the text applied to normalizing engine 44 may be a query string from query handler 36 and the normalized text may be applied to matching processor 52. A query consists of a query string of one or more words, as well as flags preferably indicating the distribution partner and other details of the original request.

Referring now again to FIG. 2, matching engine 52 may be used to construct a set of matching advertisements in database 30 in response to a query from query handler 36 in more than one way. In one embodiment, keywords normalized at the time of purchase by advertiser 24 may be matched to determine exact matches with normalized text from the query processed by query handler 36. In a preferred embodiment, both the advertisement keywords and the query string are normalized using the identical words to produce positive matches in processor.

Alternately, all keywords in the advertisement which are fully contained within the query may produce positive matches in matching engine 52 in order to produce a larger set of matching advertisements. Thus, using the broader matching approach, an advertisement associated with keyword "red bull" would be a positive match with a query for "red bull drink". Advertiser 24 may indicate at the time of purchase which matching engine approach is to be used and that selection may be stored in database 30 and/or in index 40 or TOC 42.

Advertiser 24 may also specify negative keywords for use when using this broader approach in matching engine 52 in order to cause matches to fail. Negative keywords may be text strings, for example, which cause a match to fail when they are found in the query string, even if there would otherwise be a match. For example, an advertiser using "Red Bull" as a keyword for drink product may specify a negative keyword of "dart boards" if "Red Bull" happens to also be a brand of dart boards and the advertiser does not want his advertisements to be delivered with search results for searches for "Red Bull Dart Boards".

Each known phrase may be associated with one or more advertisements in the TOC File. All associated advertisements may be combined into one result set. Only the longest phrases may be considered because advertisements associated with sub phrases may already be combined into the longest phrases in the TOC File. The output of matching engine 52 may be considered a result set of matching advertisements.

Ranking engine 54 ranks the advertisements in the result set from matching engine 52 in an order related to the potential monetary yield to the service from whom the advertisement was purchased, typically the operator of ad purchasing system 26. The potential yield may be calculated as a function of the bid by advertiser 24 and the actual or estimated success of the advertisement in attracting users, such as user 32, when listed in the results provided by search engine site 34.

For the purposes of calculating the potential yield, the bid may preferably be in the form of the maximum cost per click (MaxCPC). MaxCPC may be considered to be a bid from advertiser 24 for the highest cost per click advertiser 24 has agreed to pay for placement of the advertisement for advertiser's web site 25. The advertisement's success in achieving placement for its adds may preferably be monitored in the form of an observed (or estimated or otherwise calculated) click-through rate which may be provided by reporting system 28 as determined for example from redirect site 37, as described in more detail below, or other systems performing related functions. Data related to the bid, or MaxCPC, and success, or click-through rate may conveniently be stored in database 30. The output of ranking engine 54 may be considered to be a result set of ranked, matching advertisements.

Pricing engine 56 operates on this result set to determine a price, that is, a price to be paid by a purchaser, such as advertiser 24, of each of the ranked and matched advertisements (such as the advertisement for advertiser's web site 25) in the result set from ranking engine 54 when that advertisement is selected for viewing by user 32. It is important to note that the price charged for placement of each advertisement may be below or up to the bid or MaxCPC set by advertiser 24 when the bid was placed or when later updated.

Advertisements may also be subject to reserve prices (minimum or maximum prices for certain keywords and/or for distribution partners) and may be eliminated from the result set if they do not meet such reserve prices. Under some circumstances there may be additional discounts which are applied to prices before the result set is returned.

Filter 58 may operate on the result set from pricing engine 56 to filter out advertisements on the basis of a number of criteria, such as a minimum click-through rate which may be set by ad purchasing system 26 or by search engine site 34, a minimum price, the internet domain of advertiser 24, or the domain of a referring site which may have referred advertiser 24 to ad purchasing system 26.

As an example of the operation of system 10, ad purchaser or advertiser 24 may be a business, such as Pete's Car Wash, which has created a web site 25 on which an advertisement for its car wash business is located. In order to promote its business, Pete's Car Wash contracts with ad purchasing system 26 to have web site 25 included in result sets provided to search engine users, such as user 32, from a search engine site such as site 34, when the words "car wash" are included in the search request e.g. the query string.

Search engine sites are web sites presenting one or more search features to their users. One of the ways these sites generate revenue is by displaying advertising as part of search results. Search engine sites, such as site 34, may have a relationship with one or more partner sites having ad delivery engines, such as ad delivery engine 38, via query handlers such as handler 36, to provide a ranked set of matching advertisements in response to a search engine user's search request forwarded by site 34. In this example, in response to a request from search engine site 34 for search results related to the keywords "car wash", query handler 36 may provide a ranked set of advertisements related to car wash to search engine site 34 in the form of a set of redirection operations, for example to redirect site 37.

Each entry in this ranked set of matching advertisements may be selected by user 32 by clicking on that entry which may cause user 32 to be transparently sent to redirect site 37 which again redirects user 32, for example, to advertiser's web site 25. Redirect site 37 may also send data to reporting system 28, which may be part of redirect site 37, ad purchasing system 26 or otherwise be related to them, indicating which advertisements in data base 30 are displayed to user 32 and which, such as advertiser's web site 25, were selected by user 32 clicking so that an observed click-thru rate may be determined and entered into database 30 and/or advertiser 24 may be billed for the actual click through to his site.

After operation of matching engine 52, ranking engine 54 serves to rank or order the matching advertisements in accordance with the bid or MaxCPC arrangement between Pete's Car Wash and ad purchasing system 26. Advertiser 24 is not necessarily, however, required to pay the maximum cost per click rate originally bid.

In a preferred embodiment, Pete's Car Wash is ranked in accordance with the bid MaxCPC (adjusted for the observed click-through rate) but only required to pay just enough to get ranked above the nearest competitor's bid. This approach motivates advertisers, such as Pete's Car Wash, to bid a higher MaxCPC because that highest rate will only be charged if necessary to achieve a higher rank or order in the search results presented to user 32.

In pricing engine 56, pricing may be based on a discounted yield rank. Rank, as noted above, is based on potential financial yield to the operator of ad purchasing system 26. Pricing engine 56, however, may set actual pricing so that advertiser 24 is only required to pay the cost per click rate necessary to maintain the ranking of its ad determined by ranking engine 54.

In one example, Pete's maximum bid or MaxCPC may be $0.40 per 1000 clicks while his estimated or observed click-through rate may be 2%. Similarly, one of Pete's competitors for ranking, George, may have a maximum bid or MaxCPC of $0.50 per click but a click-through rate of only 1%. In conventional ad delivery systems, George may have been ranked higher in order over Pete because George's maximum bid is greater than Pete's. In a preferred embodiment as described above, ranking engine 54 may rank Pete's higher than George in the results list because Pete's potential yield is $0.40*0.02=0.08$ while George's potential yield is only $0.50*0.01=0.05$.

However, pricing engine 56 may operate to discount Pete's potential yield, even though the potential yield was used in determining Pete's rank, to determine the price that Pete's is required to pay for actual click-through selections by users. In the above example, the potential yield may be discounted to be just above the potential yield of Pete's competitor for ranking. Pete's may only be charged, for example by reporting system 28 or some other convenient system, $0.051 per click, that is, just enough to get ranked above the first lower ranked competitor, George, whose potential yield was $0.05 per click.

Referring now again to FIGS. 1 and 2, partner site 18 in FIG. 1 may be a search engine site 34 shown in FIG. 2, interacting directly with a search engine user and delivery engines 12 and 38 may serve as a supplier of additional or supplemental search results and ads for partner site 18. Alternately, partner site 18 may itself serve as a supplier for a search engine site dealing with a user or with another supplier site dealing with a search engine site. Many levels and configurations of search engine sites are possible.

Figure 4:
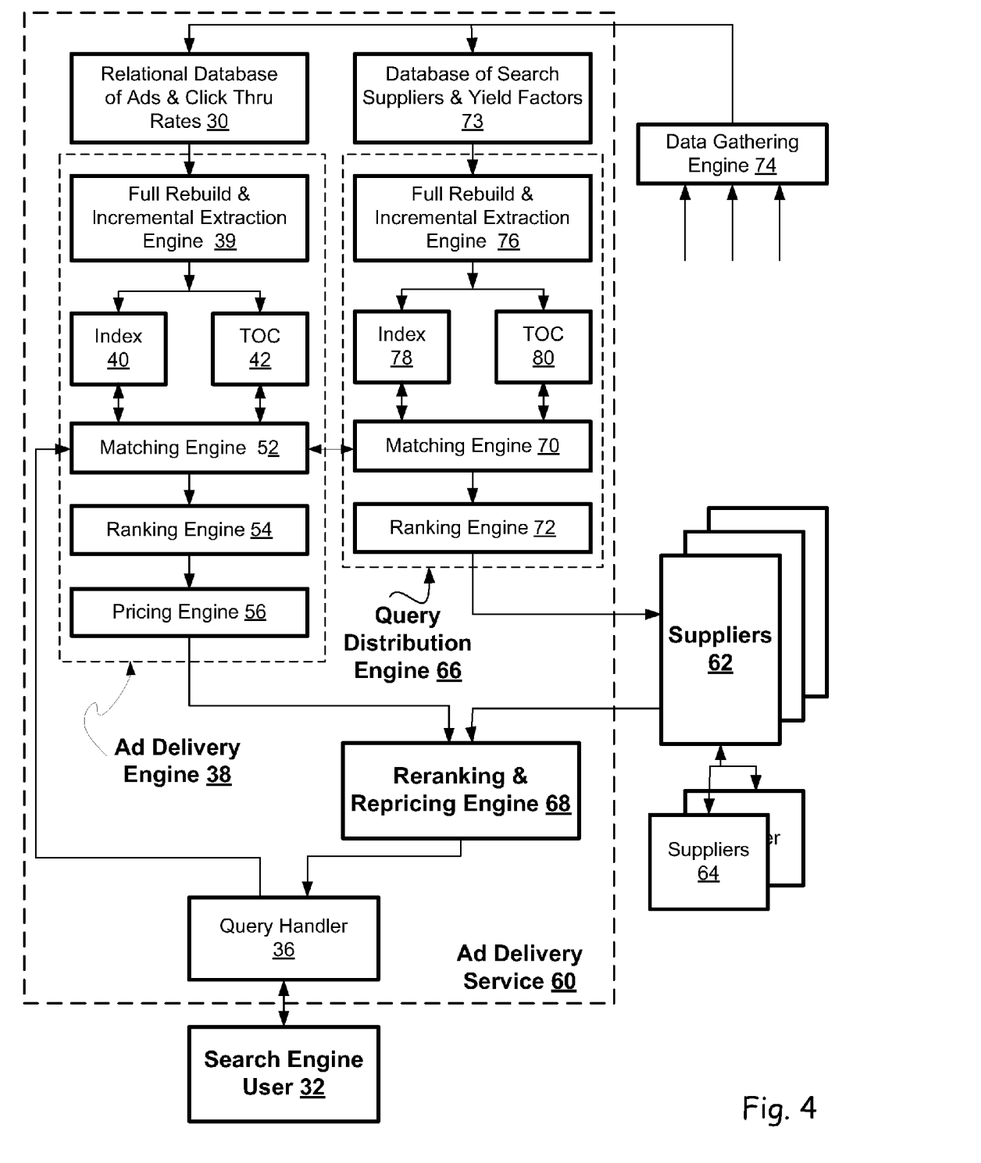
FIG. 4 is a block diagram of an ad collection and delivery system.

Referring now to FIG. 4, ad delivery service 60 may deal directly with search engine user 32 and may provide ad placement via internal ad delivery engine 38. In addition, or alternately, ad delivery service 60 may request additional search results and ads from one or more suppliers 62 who in turn may each have one or more additional suppliers 64. In order to optimally place such requests for additional search results, ad delivery service 60 may select between suppliers 62 using query distribution engine 66 based on one or more established criteria, including a quality of the supplier such as an estimated yield to ad delivery service 60 partner, for each keyword or group of keywords. Similarly, each supplier 62 may also select between its suppliers 64 using an internal query distribution engine.

In operation, user 32 may contact ad delivery service 60 with a search request or query directly or through one or more intermediate parties which act as an ad user from service 20. Query handler 36 may apply the query to matching engine 52 as a result of which a ranked and priced search result set will be developed by ad delivery engine 38 as described above, for example with regard to FIG. 2. If ad delivery service 60 does not use suppliers, at least for this query, the resultant result set would be provided by query handler 36 to user 32. If the use of suppliers 62 are desired, the query may also be directly applied by query handler 36 to matching engine 70 in query distribution engine 66 or, as shown in FIG. 4, be applied thereto by matching engine 52 so that some common functions, such as normalization, need not be duplicated.

The supplier(s) 62 matched to the query keywords by engine 70 may then be applied to ranking engine 72 to determine which suppliers 62 are most desirable so that the number of requests to suppliers for particular keywords may be reduced. Similarly, ranking engine 72 may be used to direct requests for additional ads for selected keywords to preselected suppliers based, for example, on partnership arrangements.

A set of supplier selections, together with keywords from the query, may then be applied by query distribution engine 66 to selected supplier(s) 62 by a query handler such as query handler 66. The selected supplier(s) 62, each having its own query handler, may then each respond with a ranked search result set. Ad delivery service 60 may selectively combine the search result sets provided by ad delivery engine 38 and from suppliers 62 (which may include search result sets from suppliers 64) via reranking and repricing engine 68 to be provided by query handler 36 to user 32.

Query distribution engine 66 may utilize database of search suppliers and yield rates 73 to provide identification of and information about each supplier 62 and/or categories of keywords or individual keywords to be supplied by that supplier. One or more data gathering engines 74 may be used to provide additional information, such as click-through-rates or other yield related data to ad database 30 (for use by ad delivery engine 38) and to supplier database 73 (for use by query distribution engine 66). Within query distribution engine 66, full rebuild and incremental extraction engine 76 may extract data from database 73 to produce index 78, and/or TOC 80, as extraction engine 39 generally does with respect to index 40 and TOC 42. For example, the memory in which index 78 is stored may provide faster data retrieval than the memory on which database 73 is stored and slower data retrieval than the memory on which TOC 80 is stored. Similarly, extraction engine 76 may periodically update index 78 and TOC 80 and, after a longer period, rebuild them so that the time required for matching engine 70 to accurately match keywords from the query to suppliers, and/or rank them, is reduced and/or optimized.

For a particular keyword in the query, ad delivery engine 38 may provide a ranked result set for example of results A1 through A10, each related to an advertisement. Similarly, if only one supplier 62 is used, supplier 62 may provide another rank result set, for example, including ad related results S1 through S10. Reranking and repricing engine 68 may be used to combine these result sets, by for example removing duplicates (e.g. a common advertisement associated with more than one search result) and making other comparative ranking decisions. As an example, ad A4 may be the same as (or closely related to) ad S5. Reranking engine 68 may select ad S5 for example, based on maximizing yield to ad delivery service 60 and eliminate ad A4 from the result set sent to user 32. Result B2 may be deleted for other reasons, as explained below. A final result set, which may for convenience to limited for example to 10 results, may be ranked as follows: A1, A2, B1, B3, A3, B4, B5, A5, A6 and A7.

Ranking engine 72, if present, and reranking engine 68 may be used to adjust the final result set in various ways. Ranking engine 72 may receive a group of suppliers 62, provided by matching engine 70, who provide a match for supplying a particular keyword. Ranking engine 72 may then rank or order the group of matching suppliers based a combination of many criteria, such as the relative estimated yields to service 60 between the suppliers or as compared to the estimated yields for the results produced by ad delivery engine 38. Similarly, ranking engine 72 may be used to select a subset of this group of matching suppliers 62 based on their relative times required to provide results and/or compared to the time required for delivery of results by engine 38. Many other factors may be considered by ranking engine 72 which serves to select a subset of matching suppliers and may effectively prevent requests being sent to other potential suppliers 62 even though they were matched by engine 70 to keywords in the query. Under some circumstances, it may be desirable to directly utilize the comparative ranking ability within engine 72, for example, to send out requests to various suppliers 62 in a particular time order. This may be desirable under some circumstances to permit a slower but desirable supplier 62 more time to respond or to send requests to faster suppliers 62 in an order which obtains result sets as fast as possible. Other bases on which ranking engine 72 may operate will described below in more detail.

Reranking engine 68 may serve several purposes and use various ranking criteria. One primary purpose, as noted above, may for example be to combine the result sets of engines 38 and 68. This task may be aided by ranking engine 72 by the way in which suppliers are selected, but cannot be entirely performed by ranking engine 72 which operates before the result sets are provided by suppliers (62). The bases of selection or ordering operations of ranking engines 72 and 68, that is, the criteria used for ranking, may be related.

For example, as noted above, ranking engine 72 may be used to control the time order in which requests for additional result sets are set to different suppliers. Similarly, reranking engine 68 may be used to set a time limit for response from suppliers 62, for example, one second. During operation, engine 68 may be configured to accept results from suppliers 62 during a time window and reject, or not process, results received thereafter. The time window may have a fixed length or may be adjusted by other factors such as the number and quality of other result sets received from ad delivery engine 28 and/or other suppliers 62.

Similarly, ranking engine 68 may be used to reprice elements of result sets from suppliers 62 even though at least estimated price and/or yield information may be one criterion used by ranking engine 72. For example, reranking engine 68 may be configured to change the price of an ad delivered to ad delivery service 60 by supplier(s) 62 if service 60 is acting as a supplier to another site, closer to or linked with user 32. The reason for changing the price may be similar to that of a wholesaler providing a discount to a high volume retailer. For example, reranking engine 68 may be configured to reduce the yield to ad delivery service 60 by repricing a particular ad result or series of results from one particular supplier 62 in order to favor that supplier 62. In this way, ad delivery service may be said to force the ranking or relevance criteria of an ad user, shown as ad users 84 in FIG. 5, by reducing the price charged to an ad user 84.

In order to properly rank a supplier, or ad results provided by that supplier, various information may be collected by data gathering engine 74 which may be one or more separate data gathering engines and/or combined with other portions of ad delivery service 60. One important criterion for ranking may be a yield factor, such as an estimated yield to service 60. As discussed above with regard to FIG. 2, an estimated yield may be determinable in part based on a related click-thru-rate. Ad delivery service 60 may make arrangements with one or more suppliers 62 to provide click-thru-rates for ads placed by that supplier. For example, a supplier 62 may provide data on click-thru-rates for particular ads, or keywords, directly to service 60 on a regular basis or may provide such information to service 60 upon delivering related result sets and/or as part of a result set. All such approaches for providing ad delivery service with appropriate click-thru-rates, other yield factors and other data related to ranking and repricing functions are shown in the figure as being performed by data gathering engine 74. The particular route by which the data is made available to service 60, and whether or not such data is made available via database 73, and/or index 78, or via another route to reranking engine 68 may vary with the configurations of service 60 and/or of supplier(s) 62. As noted above, with regard to query handler 36, such route may be via one or more query handlers.

Another source of data useful in populated database 73, or otherwise made available to engine 68 and/or 72, may be the accounting data of ad delivery service. For example, service 60 may have indications in past dealings with supplier(s) 62 which can useful in ranking and re-pricing operations. In the simplest case, in response to a previous query, service 60 may have already included results from supplier 62 in a plurality of result set provided to early users and have been paid by that supplier for those ad placements. As a result, data gathering engine 74 may be applied to past history records of service 60 to develop an estimated yield factor such as an estimated overall click-through-rate as well as click-through-rates for specific categories, keywords and/or ads.

Another source of data for ranking may be provided by the result set from supplier 62. For example, the relevance of a particular ad to the keyword may be determined from a comparison of the keyword and the creative content of the ad. In many cases, it may be time consuming to make such a relevance determination while a query is pending. Service 60 may, however, make such determinations after the result set has been forwarded to the user and use that relevance determination as an historical estimate of relevance from that supplier. Similarly, supplier 62 may be asked to provide a relevance value for each ad. Periodically, such relevance values may be determined after the fact and used as a credibility factor for relevance or other data provided by that supplier.

Another source of such data may be related to a known specialty or category of supplier 62. For example, sites categorized as adult sites may have higher yield factors as a result of higher click-through-rates and/or higher pricing. As a result, that categorization of a supplier's specialty such as adult entertainment may be used as a source of ranking. Negative criteria may also be used. For example, many sites including adult content websites may provide matches for the keyword "toys" but matching engine 70, ranking engine 68 and/or ranking engine 72 may be configured to reduce the ranking or prevent requests from being sent to adult sites for ads matching the keyword toys unless other keywords are present or absent in the query.

A still further source of such data may be the geographical locale of the upstream site, if any, between ad delivery service 60 and user 32 and/or the locale of the user 32. For example, if ad delivery service 60 is supplying search results to another site, the locale of that site may be determined from the IP or other network address of that site. If the receiving site is determined to be located in Europe, lower tier suppliers located in Europe may be ranked higher than other potential suppliers based in other locations. Similarly, if the locale of user 32 may be determined, for example from an IP address or other means such as regional dialect or other identifiable regional characteristics, such data may be useful for ranking. For example, a query including the keyword "theatre" may more likely to be located in England or Australia or other countries using this spelling rather than in the U.S. so that suppliers located in such countries may receive a higher ranking than others.

Figure 5:
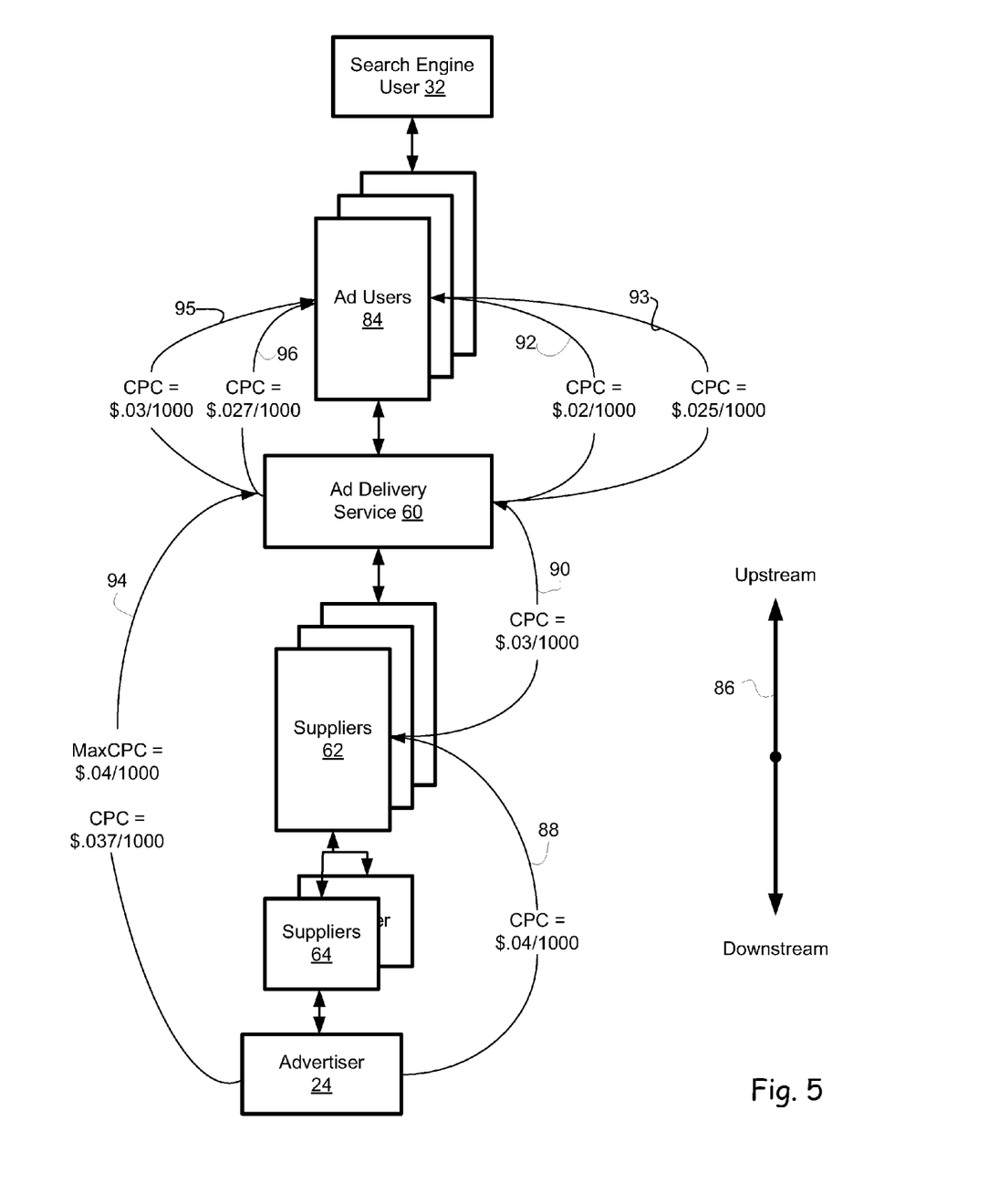
FIG. 5 is a block diagram of the upstream paths from an ad delivery service to a search engine user and the downstream path to an advertiser.

Referring now to FIG. 5, for convenience of explanation, advertiser 24 may be said to be at the downstream end of an ad delivery chain while user 32 may be said to be at the upstream end of the stream as shown by arrow 86. Advertiser 24 may make an arrangement for placing ads with ad delivery service 60 directly, or advertiser may make an ad delivery arrangement with a supplier 62, directly, or via a sub-subscriber 64. Ad delivery service may provide result sets, and an ad delivery service, directly to search engine user 32 in response to a query by hosting a search engine site or may provide result sets to one or more ad users 84, the last of which provides a result set and ad delivery to user 32.

For a simplified description of a re-pricing example, it will be assumed that advertiser 24 has made an arrangement with supplier 62 for ad placement and has agreed to pay a particular cost-per-click or CPC of $0.04 as indicated by path 88. Similarly, supplier 62 is shown to have made an arrangement to provide ads directly to ad delivery service 60 which may include the ad from advertiser 24 for which supplier 62 will pay a CPC of $0.03 as indicated by path 90. Further, ad delivery service 60 may provide the ad to ad user 84 at a CPC of $0.02 as indicated by path 92.

Advertiser may have also made an arrangement directly with ad delivery service 60 to pay a MaxCPC of $0.04 as indicated by path 94. As discussed above for example with regard to pricing engine 56 in FIG. 2, ad delivery service 60 may discount the price to be paid by advertiser 24, for a particular ad placement, to a lower CPC such as $0.037 in order to charge a minimum rate to advertiser 24 to maintain a ranking position above the next lower rank competitive ad. Ad delivery service 60 may then pay a CPC of $0.027 to ad user 84 as indicated by path 96.

Figure 6:
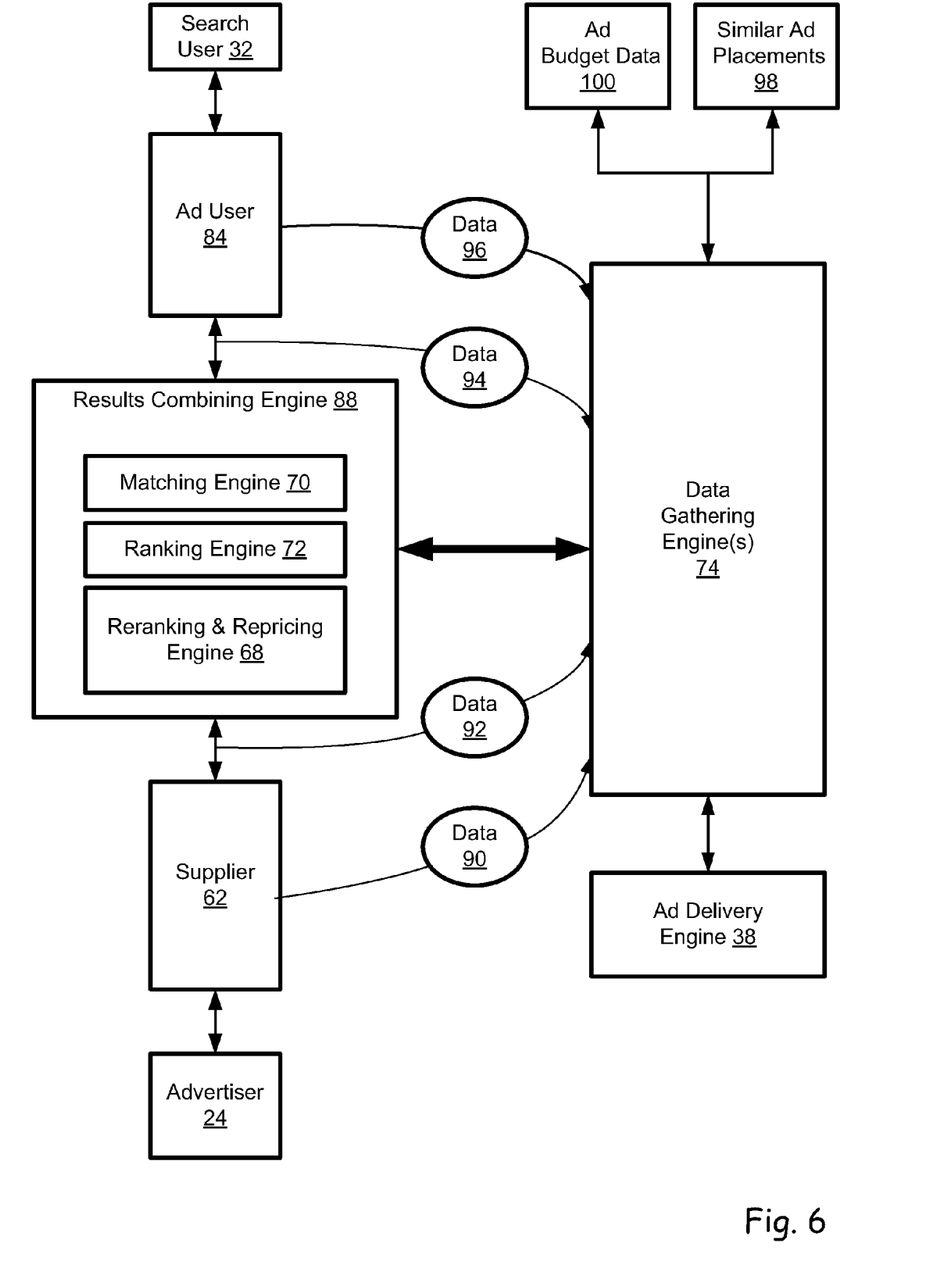
FIG. 6 is a block diagram of an example of that path together with data sources for a search result set combining engine.

Referring now also to FIG. 6, matching engine 70, and/or ranking engine 68 if present, of query distribution engine 66, together with reranking and repricing engine 68, may all have impacts on the selection, ranking and/or pricing of the elements of the search result set provided to ad user 84. These functions may be combined in results combining engine 88 as shown in FIG. 6, some of the functions of which are performed on data which may be available before ad delivery service 60 provides requests to supplier 62 and some of which may only be available after a result set, and/or other data, is provided by supplier 62 back to ad delivery service 60.

The data required by or useful to results combining engine 88 to perform its functions may be collected by data gathering engine 74 from or about supplier 62 based, for example, on the arrangements made between supplier 62 and service 60, past history of the dealings between the parties including accounting data, previously requested delivered result sets, or performance of result sets provided by supplier 62 including click-through-rates and is indicated as data 90. Other data may be obtained when the result set is provided by supplier 62 to ad delivery service 60 and is indicated as data 92. Data 92 may include data directly or indirectly related to advertiser 24, such as the ad to be placed and or the URL from which the ad is to be retrieved by user 32.

Similarly, other data required or useful to results combining engine 88 to perform its functions may be collected by data gathering engine 74 from or about ad user 84 based, for example, on arrangements made between ad user 84 and service 60, the past history of the dealings between the parties including accounting data, and previously requested and delivered result sets and the performance of such result sets including click-through-rates, and is indicated as data 94. Still other data may be obtained when the result set is requested by ad user 84 and is indicated as data 96. Data 96 may include data directly related to user 32, such as the query placed and or the IP address from which the query was placed.

Some of the data required by or useful to results combining engine 88 may also be contained in database 73 and/or in or delivered with the result set provided by ad delivery engine 38. For example, a duplicate ad may be detected and removed by comparing or matching an ad or portions of an ad (e.g. the URL of the ad) presented by supplier 62 with related data for an ad provided by ad delivery engine 38. Similarly, affiliate programs or similar arrangements, may be used to permit ad delivery service 60 to build up information related to ad suppliers and ad users by choosing to place ads from one or more selected suppliers, including the advertiser, with one or more ad users as a technique for developing data related to similar ad placements to be used by data gathering engine 74. Such selective placements may already be in use for providing performance data related to competitors.

Another source of data required by or useful to results combining engine 88 may be accounting data related to a particular ad or advertiser. For example, in addition to a CPC or MaxCPC, the advertiser (and/or an intermediate ad supplier 62) may have restrictions on the total payments they are willing to make, for example, for the placement of a particular ad and/or for the placement of that ad during a particular window of time. As an example, a particular advertiser may have an ad campaign budget limit for each calendar month. Although ad delivery service 60 may have such information in its accounting files, the time delay for the information from an accounting function that a campaign budget has been reached may result in unbillable impressions or ads being delivered.

Ad budget data 100 may be include campaign budget data for one or more ad campaigns and/or an accounting over a convenient period of the progress of the campaign toward the budget, e.g. the remaining funds or placements remaining in the campaign budget. Such data may be applied to data gathering engine(s) 74 and be supplemented or updated in response to inclusion of the ad in result sets in order to avoid unbillable placements. For example, when ad budget data 100 indicates that a campaign budget of the number of billable placements has been 90% reached, combining engine 88 may avoid inclusion of the related ad in a result set for a sufficient time related to the billing cycle to determine actual click-through-rate during that time to avoid unbillable inclusions.

Similarly, an estimated or historical click-through-rate may be used to predict when additional placements for a particular ad should be terminated to avoid unbillable placements of the ad. Controlling the placement of potentially unbillable ads may advantageously be performed by combining engine 88 because the potential loss for an unbillable ad may be balanced in engine 88 against other factors, for example, a paucity of ads in a particular result set. For example, ad delivery service 60 may selectively configure combining engine 88 so that greater tolerance to the placement of an unbillable ad from an advertiser dealing directly with service be permitted when the number or quality of the results in a result set is low or below a threshold. Similarly, engine 88 may be configured so that the tolerance to unbillable placements is extremely low, or zero, when an unbillable ad placement may result in charges to service 60 from the click of an upstream ad user 84.

Referring now also to FIG. 5, combining engine 88 may be used to reprice ads. For example, an ad which would normally be priced at a particular CPC, such as a CPC of $0.2 when supplied by service 60 to ad user 84 as indicated by path 92 in FIG. 5, may be repriced by engine 88 to a higher price, such as a CPC of $0.25 as indicated by path 93. This increase in the yield of an ad provided to ad user 84 may be used to attempt to influence ad user 84 to select this ad and/or increase its rank and therefore prominence of placement in a result set provided upstream to another ad user 84 or to search engine user 32. A threshold click-through-rate (or other factor contributing to the yield provided to service 60) may be used to determine when (and/or by how much) to increase an ad CPC to maximize or optimize the yield to ad delivery service 60.

Combining engine may similarly be used to increase the CPC of ad placed directly with ad delivery system 60 by advertiser 24, shown for example as a CPC of $0.027 as indicated on path 96 to $0.03 on path 95 for similar reasons. Additionally, or alternately, the revenue sharing between ad delivery service 60, and a downstream supplier 62 or advertiser 24 may be adjusted by combining engine 88. For example, if the CPC of an ad is increased, service 60 may revise the revenue sharing of the increased CPC with its downstream partner such as advertiser 24. In particular, the arrangement between service 60 and advertiser 24 may permit the CPC of an ad to originally be set at the minimum below the MaxCPC necessary to maintain ranking relative to the next lowest ranked ad but to be increased to a limit of the MaxCPC under certain circumstances to optimize the yield to service 60 and the realization to advertiser 24. The revenue sharing for this ad may then be adjusted by engine 88 to increase or decrease the revenue share of either party, for example, based on the extra cost to service 60 for making the determination to increase the CPC or based on the increased cost to advertiser 24 of the increased CPC.

In operation, combining engine 88 may be used to maximize or optimize the payments made to service 60 in light of the various types of data made available to service 60 for example from data gathering engine(s) 74 by adjusting the matching, ranking and pricing of a combined set of results from ad delivery engine 38 of ads from advertisers immediately downstream of service 60 together with ads provided by one or more suppliers 62 and/or their sub-suppliers 64, intermediate service 60 and advertisers such as advertiser 24.

The invention claimed is:

1. A method of delivering advertisements over a network, comprising:

extracting an index file of suppliers of search result sets for a plurality of keywords;

matching a keyword in a received query to the suppliers of related search result sets in the index file;

combining search result sets related to the keyword obtained from the matching suppliers to produce a search result set ranked in accordance with estimated yields for advertisements associated with each result in the search result set; and delivering the search result set in response to the received query.

2. The invention of claim 1 further comprising:

ranking at least some of the suppliers of the search result sets compared to other suppliers using relationship based criteria not limited to current bids; and requesting search result sets related to the keyword from the suppliers in accordance with the ranking of the suppliers.

3. The invention of claim 2 wherein the suppliers are ranked in accordance with data related to a quality of prior search result sets provided by each supplier in response to prior requests for search result sets.

4. The invention of claim 2 wherein the suppliers are ranked in accordance with a response time for providing prior search result sets provided by each supplier in response to prior requests for search result sets.

5. The invention of claim 2 wherein the suppliers are ranked in accordance with a geographical locale for advertisements with associated prior search result sets provided by each supplier in response to prior requests for search result sets.

6. The invention of claim 5 further comprising:
determining an estimated geographical locale for advertisements associated with the prior search result sets in accordance with a network address of each supplier.

7. The invention of claim 6 further comprising:
determining an estimated geographical locale for a source of the query in accordance with a network address of the source.

8. The invention of claim 3 wherein the quality is related to a geographical locale for the query.

9. The invention of claim 8 further comprising:
determining an estimated geographical locale for a source of the query in accordance with a network address of the source.

10. The invention of claim 2 wherein ranking at least some of the suppliers further comprises:
ranking at least some of the suppliers in accordance with a categorization of ad content for the advertisements associated with each of the at least some of the suppliers.

11. The invention of claim 10 further comprising:
comparing a categorization of content of the query with a categorization of ad content associated with each supplier.

12. The invention of claim 2 further comprising:
repricing at least some of the ads from the bids provided by the matching suppliers before delivering the search result set in accordance with data related to an estimated yield for each ad.

13. The invention of claim 2 further comprising:
repricing at least some of the ads from bids provided by the matching suppliers in accordance with data related to estimated click through rate for each ad before delivering the search result set in response to the query.

14. The invention of claim 13 further comprising:
receiving search result sets from at least some of the matching suppliers including data related to click through rates for ads related to at least some of the results in the search result set provided by each of those matching suppliers.

15. The invention of claim 2 further comprising:
repricing at least some of the ads from the matching suppliers before delivering the search result set in response to the query by changing cost per click data delivered with the search result set.

16. The invention of claim 2 further comprising:
effectively repricing at least some of the ads from the matching suppliers before delivering the search result set by changing a revenue sharing arrangement with those suppliers.

17. A method of delivering advertisements over a network, comprising:
matching a keyword in a received query to suppliers of related search result sets from an index of suppliers extracted from a database of suppliers and to ads to be placed from an index of advertisers extracted from a database of ads to be placed;
combining search result sets related to the keyword obtained from the matching suppliers and a search result from the matching ads to be placed to produce a combined search result set ranked in accordance with estimated yields for advertisements associated with each result in the combined search result set; and
delivering the combined search result set in response to the received query.

18. The invention of claim 17 wherein combining further comprises:
selecting one search result set entry, from a set of search result set entries associated with a common advertisement, in accordance with an estimated yield.

19. The invention of claim 18 further comprising:
ranking the matching suppliers in accordance with their ranking before requesting search result sets related to the keyword from those matching suppliers.

20. The invention of claim 19 further comprising:
ranking search result sets received from the matching suppliers.

21. The invention of claim 20 further comprising:
ranking search results associated with the matching advertisements.

22. The invention of claim 21 wherein combining further comprises:
combining the ranked search result sets from the matching suppliers and those associated with the matching advertisements in accordance with their individual rankings.

23. The invention of claim 20 wherein combining further comprises:
combining the ranked search result sets from the matching suppliers within a preselected period of time and the ranked search result sets associated with the matching advertisements in accordance with their individual rankings.

24. The invention of claim 23 wherein combining further comprises:
adjusting the preselected period of time in accordance with a quality of the ranked search result set associated with the matching advertisements.

25. The invention of claim 24 wherein the quality is the quantity of the matching advertisements.

26. The invention of claim 17 further comprising:
repricing ads associated with combined search result set from the bids received from the suppliers of those ads before delivering the search result set in accordance with data related to estimated yield for each ad.

27. The invention of claim 17 further comprising:
repricing at least some of the ads in the combined search result set from the bids received from the suppliers of those ads in accordance with data related to an estimated click through rate for each ad.

28. The invention of claim 17 further comprising:
receiving search result sets from at least some of the matching suppliers including data related to click through rates for associated ads.

29. The invention of claim 17 further comprising:
repricing at least some of the ads associated with the combined result set from the bid price received from the supplier of each of those ads.

30. The invention of claim 17 further comprising:
effectively repricing at least some of the ads associated with the combined search result set by changing a revenue sharing arrangement associated with each such repriced ad.

* * * * *

UNITED STATES PATENT AND TRADEMARK OFFICE
CERTIFICATE OF CORRECTION

PATENT NO. : 7,725,464 B2  Page 1 of 1
APPLICATION NO. : 11/535958
DATED : May 25, 2010
INVENTOR(S) : Michael L. Grubb et al.

It is certified that error appears in the above-identified patent and that said Letters Patent is hereby corrected as shown below:

In column 5, line 31, delete "phrases" and insert -- phrases. --, therefor.

Signed and Sealed this

Third Day of August, 2010

David J. Kappos
*Director of the United States Patent and Trademark Office*